UNITED STATES PATENT OFFICE.

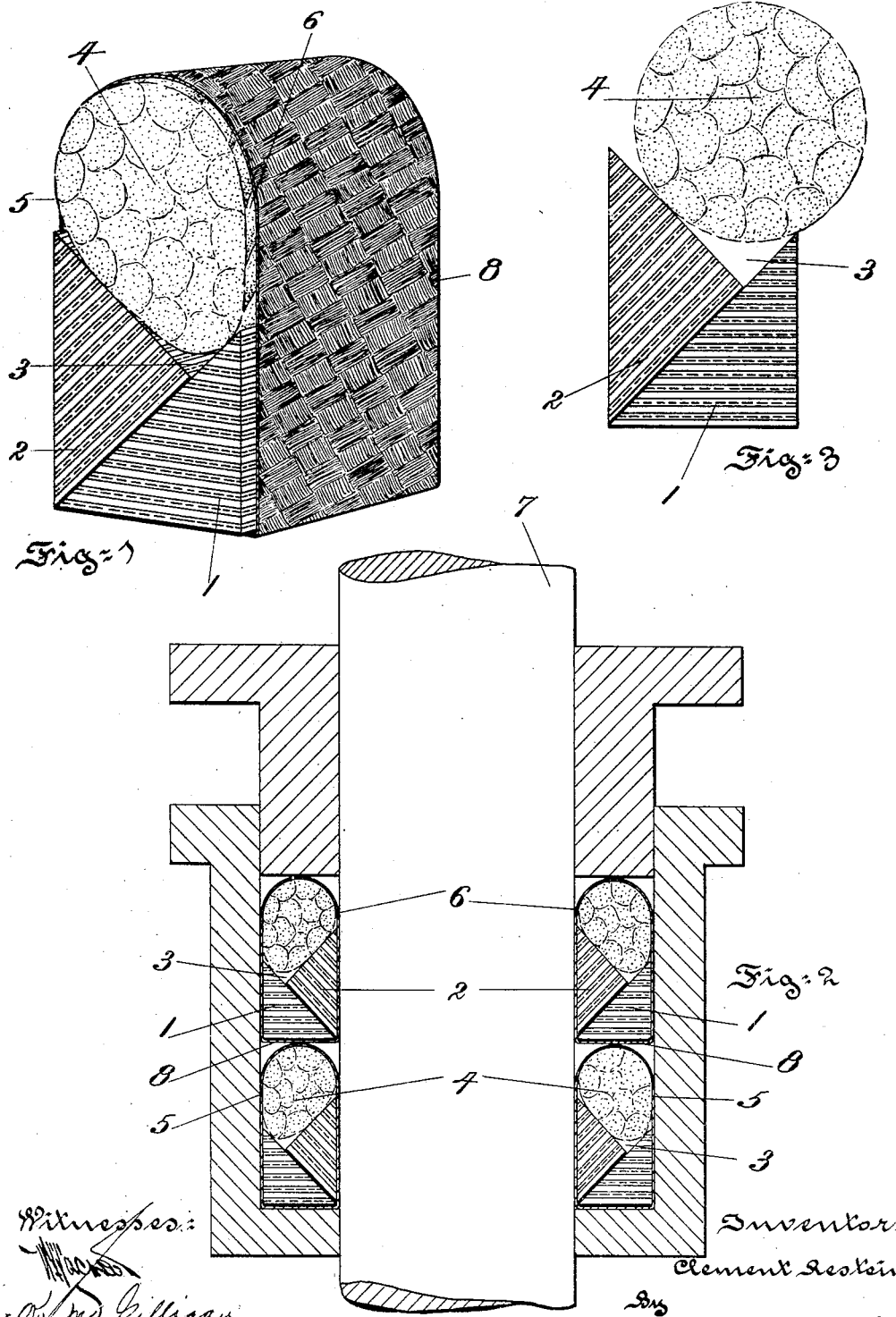

CLEMENT RESTEIN, OF PHILADELPHIA, PENNSYLVANIA.

PACKING.

No. 809,581.      Specification of Letters Patent.      Patented Jan. 9, 1906.

Application filed May 28, 1904. Serial No. 210,302.

*To all whom it may concern:*

Be it known that I, CLEMENT RESTEIN, a citizen of the United States, residing at the city of Philadelphia, in the county of Philadelphia and State of Pennsylvania, have invented new and useful Improvements in Packing, of which the following is a specification.

This invention relates to packings which comprise a pair of wedge members, as of layers of duck and rubber combined with an absorbent cushion; and its object is to so arrange and combine these parts as that sliding motion of the wedge members is encouraged and thorough lubrication is promoted.

The nature, characteristic features, and scope of my invention will be more fully understood from the following description, taken in connection with the accompanying drawings, forming part hereof, and in which—

Figure 1 is a perspective view illustrating a packing embodying features of the invention. Fig. 2 is a view, principally in section, illustrating a packing of the invention in application to a rod-gland or box; and Fig. 3 is a sectional view showing the parts prior to their assemblage.

In the drawings the wedge members may be made by cutting a rectangle consisting of alternate layers of duck and rubber diagonally, so that the wedge members 1 and 2 are in cross-section of the shape of right-angle isosceles triangles. The side of the wedge member 2 is arranged to slide on the hypotenuse of the wedge member 1, thereby forming a V-shaped groove 3, which serves a twofold purpose, in that it constitutes a receptacle for a supply of oil or other lubricant and in that it affords a seat for a portion of the soft absorbent cushion 4, originally circular in cross-section. The lower portion of the cushion 4 is arranged in this groove 3; but it does not extend to the bottom of the groove so as to fill it. On the contrary, there is space at the bottom of the groove for oil or lubricant. The upper portion of the cushion extends above the wedges, so that its faces 5 and 6 are exposed on both sides of the packing. The result of this is that the face 6 of the cushion can freely lubricate the rod 7. Furthermore, the cushion, as of lubricated cotton or the like, is in contact with the wedge members, so that it can give up a supply of oil to them, thus insuring their proper lubrication. The braiding 8 draws the cushion from the position of Fig. 3 to that of Fig. 1 and slightly distorts only its lower portion. In use the packing remains well lubricated and does not dry out, and this is due to the reserve supply of oil or lubricant which the soft absorbent cushion can contain and advantageously distribute. Since the cushion is comparatively soft and is arranged to extend above the wedges, it follows that the latter are free to slide in response to pressure exerted upon them, it being obvious that if the cushion were hard and unyielding the wedges of the different turns or rings of the packing would jam, and therefore not be free to slide.

It will be obvious to those skilled in the art to which my invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A packing comprising a pair of wedge members having the cross-sectional shape of right-angle isosceles triangles and having the side of one arranged in sliding contact with the hypotenuse of the other thereby forming a V-shaped groove, and a soft absorbent cushion arranged in the groove in contact with said members and having its face exposed on both sides of the packing whereby it can lubricate freely, substantially as described.

2. A packing comprising a pair of wedge members having the cross-sectional shape of right-angle isosceles triangles and having the side of one arranged to slide in contact with the hypotenuse of the other thereby forming a V-shaped groove, and a soft absorbent cylindrical cushion arranged in the groove and supported by said members to afford a lubricant-space and having its faces exposed on both sides of the packing whereby it can lubricate freely, substantially as described.

In testimony whereof I have hereunto signed my name.

CLEMENT RESTEIN.

Witnesses:
     K. M. GILLIGAN,
     W. J. JACKSON.